United States Patent [19]
Krupp

[11] Patent Number: 5,348,426
[45] Date of Patent: Sep. 20, 1994

[54] BALL NOSE CUTTER HAVING A SINGLE CUTTER INSERT

[76] Inventor: Ernest E. Krupp, 38940 Moravian, Clinton Township, Macomb County, Mich. 48036

[21] Appl. No.: 1,859

[22] Filed: Jan. 8, 1993

[51] Int. Cl.⁵ .......................... B23C 5/10; B23C 5/22; B23C 5/20
[52] U.S. Cl. ........................................ 407/40; 407/42; 407/62; 407/65
[58] Field of Search .................. 407/42, 54, 62, 64, 407/65, 113, 114, 40

[56] References Cited

U.S. PATENT DOCUMENTS

| | | | |
|---|---|---|---|
| 2,346,084 | 4/1944 | Sanocki | 407/64 |
| 4,251,172 | 2/1981 | Durand | 407/42 |
| 4,355,932 | 10/1982 | Koppelmann et al. | 407/54 |
| 4,423,989 | 1/1984 | Kress et al. | 407/42 |
| 4,525,109 | 6/1985 | Bylund | 407/42 |
| 4,525,110 | 6/1985 | Stojanovski | 407/40 |
| 4,588,331 | 5/1986 | Yoshinori | 407/42 |
| 4,623,285 | 11/1986 | Costil | 407/42 |
| 4,898,499 | 2/1990 | Tsujimura et al. | 407/42 |
| 4,919,573 | 4/1990 | Tsujimura et al. | 407/42 |
| 5,108,234 | 4/1992 | Stojanovski | 407/40 |

OTHER PUBLICATIONS

Ingersoll Cutting Tools Catalog: "Max-1 Indexable End Mills" Dated 1985.
Valenite Milling Systems Fact Sheet: "Ball Nose End Mill" Dated before Jul. 15, 1992.
Modern Machine Shop Magazine: "Copy Milling Inserting Itself" pp. 76–83 dated Oct. 1991.

*Primary Examiner*—William E. Terrell
*Attorney, Agent, or Firm*—Peter D. Keefe

[57] ABSTRACT

A ball nose cutter having a replaceable single cutter insert in which the cutting edges thereof include a pair of mutually spaced apart cutting tips, one cutting tip at a time being selected for use by being located at the centerline of rotation of the ball nose cutter. The cutter insert is of circular cross-section for rotatably seating within a circularly cross-sectioned groove in a cutter body. A bore in the cutter insert is aligned with an off-axis threaded bore in the cutter body so that a holder screw which passes therethrough threadably holds the cutter insert with respect to the cutter body. A planar face is provided adjacent each cutting edge, wherein each planar face has an orientation so that the selected cutting tip is exactly located on the centerline rotation of the ball nose cutter.

9 Claims, 1 Drawing Sheet

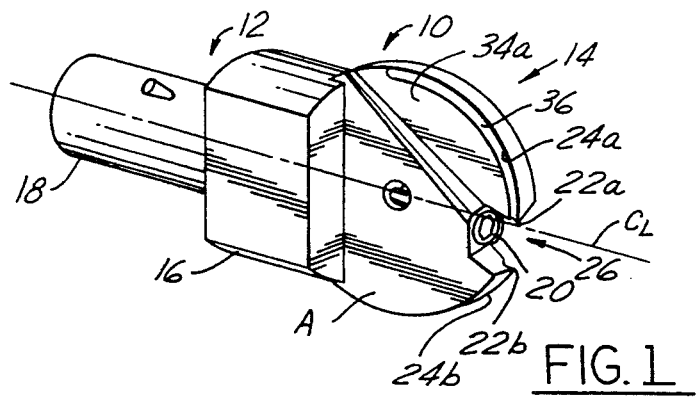
FIG.1
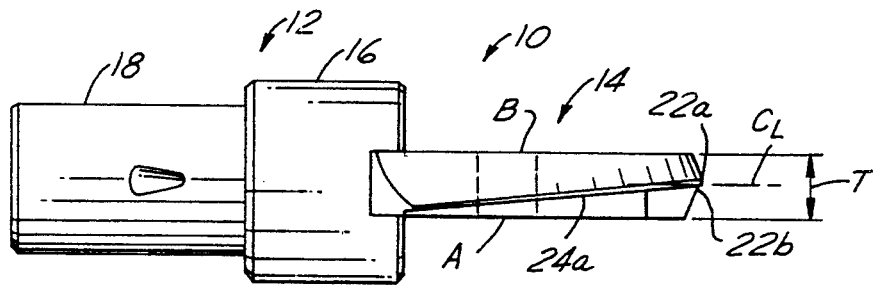
FIG.2
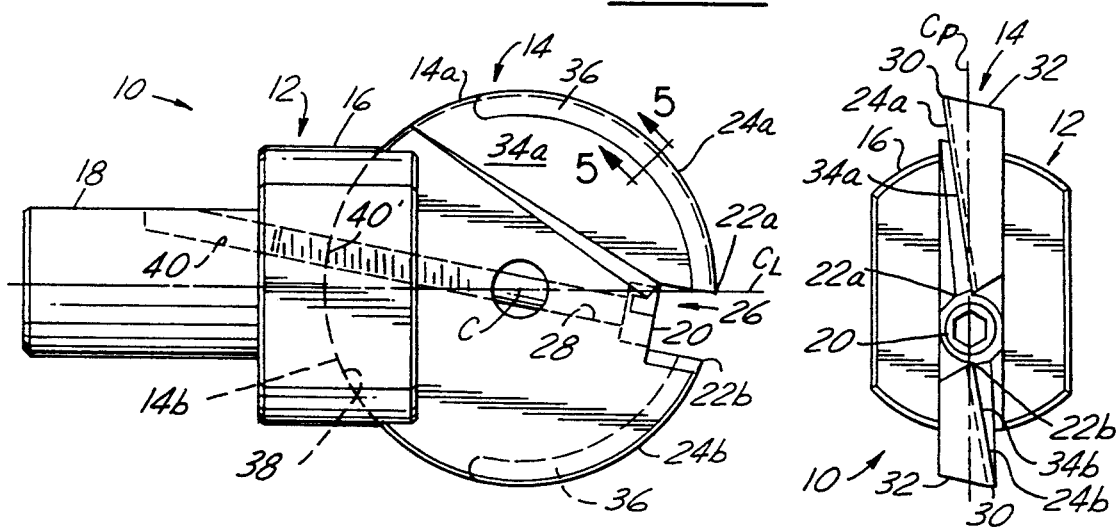
FIG.3
FIG.4
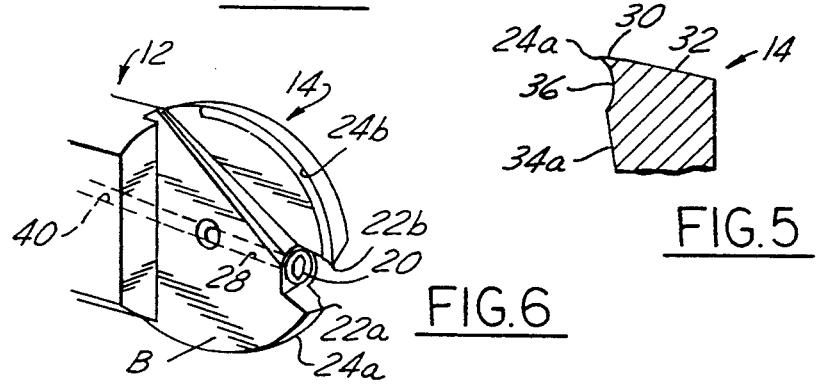
FIG.5
FIG.6

BALL NOSE CUTTER HAVING A SINGLE CUTTER INSERT

BACKGROUND OF THE INVENTION

1. Field of the invention

The present invention relates to single insert ball nose cutters used in the machine tool industry, and more particularly to a ball nose cutter having a circularly cross-sectioned cutter insert removably resident in a circularly curved holding groove of a cutter body. Still more particularly, the present invention relates to a ball nose cutter of the class aforesaid wherein the cutter insert has a pair of cutting tips, either one of which being selectable for service.

2. Description of the Prior Art

Indexable end milling cutting tools are well known in the art for use in a variety of machining operations. These cutting tools include a head portion having replaceable cutting edges of one or more predetermined rake angles for cutting, boring or otherwise contouring a workpiece. The other end of these cutting tools have a shank for removable connection with an end mill or other torque transmitting machine. The actual speed and contact relationship the cutting tool with the workpiece is ordinarily, but not necessarily, predetermined by computer numeric control (CNC) of the torque transmitting machine.

One type of indexable end milling cutting tool is a ball nose cutter. A first class of conventional ball nose cutter has a ball nose shaped cutter body of predetermined diameter. In a first form, the cutter body is constructed of a high speed steel or solid carbide material that is provided with one or more cutting edges of predetermined rake, wherein a gullet for chip removal is provided adjacent the one or more cutting edges. In a second form, which is improved over the first form, the cutting body is again of a ball nose shape and constructed of an alloy steel. The cutting body now has removably connected thereto a plurality of seated cutter inserts of generally rectangular shape, provided with one or more cutting edges, and constructed of brazed carbide, ceramic or other hardened material. Adjacent the cutter inserts, the cutter body is provided with one or more gullets for facilitating removal of chips from the workpiece. An example of the second form of ball nose cutter are models 16W1X and 16W1B of the Ingersoll Cutting Tool Company, Rockford, Ill. The aforesaid first class of ball nose cutter suffers from complicated, difficult and expensive processes to restore the ball nose cutter specification whenever the cutting edges thereof have become dulled from use.

Accordingly a second class of conventional ball nose cutter has been developed in the prior art in which a single circular cross-sectioned cutter insert is removably seated in a fiat holding groove of a ball nose shaped cutter body, wherein a screw is transversely secured with respect to the cutter body for holding the cutter insert in a seated relationship with respect to the flat holding groove. A cutting edge is provided on opposite sides of the cutting insert, and a gash is provided on each side of the cutter insert at the centerline of the ball nose cutter. Each gash provides a selectable cutting point of sorts for promoting neat, curled chips from the workpiece. An example of this second class of ball nose cutter is produced by Walter Kieninger Co. of Lahr, Germany, and represented in the U.S.A. by Dapra Corporation of Bloomfield, Conn. The aforesaid second class of ball nose cutter suffers from the absence of a true cutting tip. The "gash" is a poor substitute therefor, but is provided because of the symmetry necessary to make the cutter insert reversible with respect to the flat holding groove.

Accordingly, what is needed is a ball nose cutter having a replaceable single cutter insert in which the cutting edge includes at least one true cutting tip.

SUMMARY OF THE INVENTION

The present invention is a ball nose cutter having a replaceable single cutter insert in which the cutting edge thereof includes a pair of cutting tips, one cutting tip at a time being selected for use by being located at the centerline of rotation of the ball nose cutter.

The ball nose cutter according to the present invention is composed of a circularly cross-sectioned cutter insert having a first portion and an opposite second portion. The first portion is provided with a pair of cutting edges, one cutting edge being located on diametrically opposite sides of the cutter insert. The first portion, directly opposite the second portion, is characterized by a slot having on either side thereof a cutting tip formed of a respective cutting edge. The slot extends a short distance toward the center of the cutter insert and then communicates with an insert bore passing entirely through the cutter inserting the aforesaid center.

The cutter body is provided at one end with a shank for engaging a torque transmitting machine, while the other end is provided with an insert holder characterized by a curved groove of circular cross-section which matches that of the second portion of the cutter insert. A threaded holder bore is provided in the cutter holder which communicates with the curved groove. The holder bore is oriented off-axis from the centerline of the shank. Each cutting edge is provided with an angled planar face oriented so that the cutting tip thereof is located on the central plane of the cutter insert.

The holder bore in the cutter holder is oriented such that when a holding screw is placed through the insert bore in the cutter insert and then threaded into the holder bore, one cutting tip is exactly located on the centerline of the shank. Upon removal of the holding screw, removal, reversal and replacement of the cutter insert and finally rethreading of the holding screw into the holder bore, the other cutting tip is exactly located on the centerline of rotation. Accordingly, selection of a cutting tip from among dual cutting tips is made possible by a curved groove in the cutter body which permits the curve of the second portion of the cutter insert to be reoriented each time it is reversed so as to orient the selected cutting tip directly at the centerline of the shank.

Accordingly, it is an object of the present invention to provide a ball nose cutter having a single cutter insert, the single cutter insert being provided with dual cutting tips, either one of which being selectable for use.

It is a further object of the present invention to provide a ball nose cutter having a single cutter insert, the single cutter insert being provided with dual cutting tips, either one of which being selectable for use, in which the cutter insert is of circular cross-section and the cutter body which supports the cutter insert is provided with a circularly curved groove.

It is another object of the present invention to provide a ball nose cutter having a single cutter insert, the single cutter insert being provided with dual cutting tips, either one of which being selectable for use, in which the cutter insert is of circular cross-section and the cutter body which supports the cutter insert is provided with a circularly curved groove, wherein the selected cutting tip is located at the centerline of rotation of the ball nose cutter.

It is yet an additional object of the present invention to provide a ball nose cutter having a single cutter insert, the single cutter insert being provided with dual cutting tips, either one of which being selectable for use, in which the cutter insert is of circular cross-section and the cutter body which supports the cutter insert is provided with a circularly curved groove, wherein one cutting tip is located at the centerline of rotation of the nose cutter, and when the cutter insert is reversed with respect to the curved groove, the other cutting tip is located at the centerline of rotation.

It is still a further object of the present invention to provide a bail nose cutter having a single cutter insert, the single cutter insert being provided with dual cutting tips, either one of which being selectable for use, in which the cutter insert is of circular cross-section and the cutter body which supports the cutter insert is provided with a circularly curved groove, wherein one cutting tip located at the centerline of rotation of the nose cutter, and when the cutter insert is reversed with respect to the curved groove, the other cutting tip is located at the centerline of rotation, and further wherein a holding screw is oriented in a predetermined off-axis orientation so as to provide the foregoing cutting tip selectability.

These, and additional objects, advantages, features and benefits of the present invention will become apparent from the following specification.

BRIEF DESCRIPTION OF THE DRAWINGS

FIG. 1 is a perspective view of the ball nose cutter according to the present invention.

FIG. 2 is a top plan view of the ball nose cutter shown in FIG. 1.

FIG. 3 is a side view of the ball nose cutter shown in FIG. 1.

FIG. 4 is a front end view of the ball nose cutter shown in FIG. 1.

FIG. 5 is a detail sectional view of the preferred cutting edge of the cutter insert of the ball nose cutter, seen along lines 5—5 in FIG. 3.

FIG. 6 is a perspective view of the ball nose cutter, shown with the cutter insert reversed in relation to the cutter holder as compared with the depiction of FIG. 1.

DETAILED DESCRIPTION OF THE PREFERRED EMBODIMENT

Referring now to the Drawing, an overview of the present invention may be discerned from FIG. 1 which depicts the bail nose cutter 10 according to the present invention. The ball nose cutter 10 is composed of two major components: a cutter body 12 and a cutter insert 14. The cutter body 12 is structured for being connected with a torque transmitting machine via a shank 18 and includes an insert holder 16 opposite the shank. The cutter insert 14 is removably connected with the insert holder 16 via a holding screw 20. The axial center of the shank 18 defines a centerline $C_L$ of rotation of the shank 18, and, therefore, of the cutter insert 14. As can further be seen from FIG. 1, one cutter tip 22a of the cutter insert 14 is located exactly on the centerline $C_L$, while the other cutter tip 22b is distanced therefrom. It will be still further noted from FIG. 1, that the cutter insert 14 is provided with cutting edges 24a, 24b located on diametrically opposite sides thereof. The combination of the cutting edges 24a, 24b and the selected cutting tip 22a or 22b which is located on the centerline $C_L$ cooperate so as to provide cutting, milling, or otherwise contouring of a workpiece when rotated by the torque transmitting machine via the cutter body 12.

The structure and function of the ball nose cutter 10 according to the present invention will now be detailed with greater specificity, with reference being directed additionally to FIGS. 2 through 6.

The cutter insert 14 is of a predetermined circular cross-section and has a predetermined thickness T between sides A and B (see FIG. 2). The cutter insert 14 includes a first portion 14a and an opposite second portion 14b. The second portion 14b is structured for being seatably received by a curved groove in the insert holder 16 (discussed hereinbelow) and the first portion 14a is thereupon located exterior to the curved groove. The exposed portion 14a of the cutter insert 14 is provided with the aforesaid pair of cutting edges 24a, 24b, one cutting edge being located on diametrically opposite sides of the cutter insert. The cutting tips 22a, 22b are mutually separated by a slot 26. The slot 26 extends a short distance toward the center C of the cutter insert 14 and then communicates with an insert bore 28 passing entirely through the cutter insert, intersecting the center C of the cutter insert.

Each cutting edge 24a, 24b is provided with an adjacent primary land 30 and further provided with a secondary land 32 in a manner well known in the milling tool art. Further, each cutting edge 24a, 24b is provided with a respective planar face 34a, 34b, each of which being angled uniformly from being co-planar with its respective side A, B proximate the second portion 14b of the cutter insert toward the central plane $C_p$ of the cutter insert 14, terminating in respective cutting tips 22a, 22b. The central plane $C_p$ bisects the cutter insert 14 between sides A and B thereof. Accordingly, each cutting edge 24a, 24b smoothly goes from being at its respective side A, B to being at the central plane $C_p$, whereat one of the cutting tips 22a, 22b is selectively at the centerline $C_L$. Each cutting edge 24a, 24b is further provided with an adjacent gullet 36 for facilitating removal of chips from the workpiece being engaged by the cutting edges. The cutting edges 24a, 24b may have a preselected rake angle appropriate to certain cutting jobs on certain workpiece materials; a positive rake angle is depicted in the Drawing as an example thereof.

The cutter body 12 is provided at one end with the aforesaid shank 18 for engaging a spindle of a torque transmitting machine of any conventional manufacture. The other end of the cutter body 12 is provided with the aforesaid insert holder 16. The insert holder 16 is provided with the aforementioned curved groove 38 of circular cross-section, wherein the curved groove faces directly away from the shank 18. The second portion 14b of the cutter insert 14 is dimensioned to seat in the curved groove 38 and be rotatably slidable therewithin. In this regard, the radius of curvature of the perimeter of the base portion 14b of the cutter insert 14 matches that of the perimeter of the curved groove 38; accordingly, the base portion may be removed, reversed, replaced and rotated in the curved groove (or rotated outside the curved groove prior to replacement) from the relative position shown in FIG. 1 to that shown in FIG. 6.

A threaded holder bore 40 is provided in the cutter body 12, wherein the holder bore communicates with the curved groove 38 via an opening 40'. The holder bore 40 is oriented off-axis from the centerline $C_L$. The holder bore 40 in the cutter body 16 is oriented such that when the holding screw 20 is placed through the insert bore 28 in the cutter insert 14 and then threaded thereinto, the cutter insert is at a first relative orientation wherein one cutting tip (cutting tip 22a in FIG. 1) is exactly located on the centerline $C_L$, this cutting tip then being the selected cutting tip; and upon removal of the holding screw 20, removal, reversal, replacement of the cutter insert 14 with respect to the curved groove 38 and finally rethreading of the holding screw into the threaded bore, the cutter insert is at a second relative orientation wherein the other cutting tip (cutting tip 22b in FIG. 6) is exactly located on the centerline $C_L$, this cutting tip then being a newly selected cutting tip. Accordingly, selection of a cutting tip from among the dual cutting tips 22a, 22b is made possible by the curvature of the curved groove 38 in the cutter body matching the curvature of the base portion 14b of the cutter insert 14 which permits the cutter insert to be reoriented each time it is reversed so that when the insert bore 28 aligns with the holder bore 40, the selected cutting tip of cutting tips 22a, 22b is located directly at the centerline $C_L$.

Operation will now be detailed, with comparison being made between FIGS. 1 and 6. The shank 18 is placed in a torque transmitting machine, and as the shank rotates the cutting edges 24a, 24b engage a workpiece. In this regard, a selected cutter tip 22a first engages the workpiece, as indicated by FIG. 1. Continued operations will eventually result in the first selected cutter tip 22a becoming dull. In order to provide a fresh cutter tip, the holder screw 20 is unthreaded from the holder bore 40, the cutter insert 14 removed from the curved groove 38, sides A and B reversed relative to the curved groove 38 and then the cutter insert is reinserted into the curved groove, as shown now in FIG. 6. The holder screw 20 is passed through the insert bore 28 and is then used to align the insert bore with the holder bore 40; thereupon the holder screw is threaded into the holder bore. Accordingly, cutting tip 22b has become the selected cutting tip, in that it is now located at the centerline $C_L$.

To those skilled in the art to which this invention appertains, the above described preferred embodiment may be subject to change or modification. For example, while circularly curved surfaces are described herein as being the preferred groove and cutter insert interface, this is not a requirement in that any two mutually seatable surface shapes having a reciprocal interface therebetween is acceptable provided the cutter insert, each time it is reversed relative to the groove (curved or otherwise), assumes the aforementioned first and second orientations necessary to bring each of the cutting tips selectively into alignment with the centerline $C_L$. Further in this regard, the cutter insert need not necessarily be circular in cross-section. Such change or modification can be carried out without departing from the scope of the invention, which is intended to be limited only by the scope of the appended claims.

What is claimed is:

1. A ball nose cutter for being connected with a torque transmitting machine, said ball nose cutter comprising:

a cutter body comprising:
   shank means for connecting with the torque transmitting machine, said shank means defining a centerline of rotation, said centerline of rotation defining an axis of said cutter body; and
   an insert holder connected with said shank means, said insert holder being provided with a groove having a first predetermined shape;

a generally disc shaped cutter insert having a first portion and an opposite second portion, said second portion having a second predetermined shape that is reciprocal to that of said first predetermined shape so that said second portion is seatable within said groove in at least two relative orientations with respect thereto, said at least two relative orientations comprising a first relative orientation and a second relative orientation, said cutter insert having a center, a first side, a second side and a central plane bisecting said cutter insert between said first and second sides thereof, said cutter insert further comprising:
   cutting edge means located on said first portion for cutting a workpiece in response to rotation of said shank by the torque generating machine; and
   a pair of cutting tips connected with said cutting edge means, each cutting tip of said pair of cutting tips being located at said a central plane of said cutter insert, said pair of cutting tips being mutually nondiametrically opposed in said central plane with respect to said center; and means for releasably connecting said cutter insert to said cutter body when said second portion of said cutter insert is seated in said groove at a selected one of said first and second relative orientations;

wherein when said second portion of siad cutter insert is at said first orientation said first and second sides thereof have a first relative placement with respect to said groove and a selected one of said cutting tips is located at said centerline of rotation, and when said second portion of said cutter insert is at said second orientation said first and second sides thereof have a second relative placement with respect to said groove that is reversed with respect to said first relative placement and the other of said cutting tips is located at said centerline of rotation; and wherein said means for releasably connecting comprises:

said insert holder having a threaded holder bore oriented at an oblique angle with respect to said cutter body axis, said holder bore communicating with said groove;

an insert bore located in said central plane, passing through said center of said cutter insert and extending along a diameter of said cutter insert, said insert bore being aligned with respect to said center and a medial location between said pair of cutting tips, said insert bore being aligned with said holder bore at each of said first and second relative orientations, said insert bore being located substantially adjacent each cutting tip of said pair of cutting tips; and a holding screw dimensioned to pass through said insert bore and threadably engage with the threads of said holder bore.

2. The ball nose cutter of claim 1, wherein said cutting edge means comprises:
a first cutting edge located at said first side of said first portion of said cutter insert, said first cutting edge originating substantially proximate said second portion of said cutter insert and terminating in said first cutting tip; and
a second cutting edge located at said second side of said cutter insert diametrically opposite said first cutting edge, said second cutting edge originating substantially proximate said second portion of said cutter insert and terminating in said second cutting tip.

3. The ball nose cutter of claim 2, further comprising:
a first planar face adjacent said first cutting edge, said first planar face being smoothly angled from being substantially co-planar with said first side at a location substantially proximate said second portion to being located at said central plane at said first cutting tip; and
a second planar face adjacent said second cutting edge, said second planar face being smoothly angled from being substantially co-planar with said second side at a location substantially proximate said second portion to being located at said central plane at said second cutting tip.

4. The ball nose cutter of claim 3, wherein said first predetermined shape of said groove is circular having a predetermined radius of curvature which provides a first perimeter; and wherein said second predetermined shape of said second portion of said cutter insert is circular having substantially said predetermined radius of curvature which provides a second perimeter, said first and second perimeters being mutually seatable with respect to each other.

5. A ball nose cutter for being connected with a torque transmitting machine, said ball nose cutter comprising:
a cutter body comprising:
shank means for connecting with the torque transmitting machine, said shank means defining a centerline of rotation, said centerline of rotation defining an axis of said cutter body; and
an insert holder connected with said shank means, said insert holder being provided with a groove having a first predetermined shape, said insert holder having a holder bore oriented at an oblique angle with respect to said axis of said cutter body, said holder bore communicating with said groove;
a generally disc shaped cutter insert having a first portion and an opposite second portion, said second portion having a second predetermined shape that is reciprocal to that of said first predetermined shape so that said second portion is seatable within said groove in at least two relative orientations with respect thereto, said at least two relative orientations comprising a first relative orientation and a second relative orientation, said cutter insert having a center, a first side, a second side and a central plane bisecting said cutter insert between said first and second sides thereof, said cutter insert further comprising:
cutting edge means located on said first portion for cutting a workpiece in response to rotation of said shank by the torque generating machine;
a pair of cutting tips connected with said cutting edge means, each cutting tip of said pair of cutting tips being located at said central plane of said cutter insert, said pair of cutting tips being mutually nondiametrically opposed in said central plane with respect to said center; and
an insert bore located in said central plane, passing through said center of said cutter insert and extending along a diameter of said cutter insert, said insert bore being aligned with respect to said center and a medial location between said pair of cutting tips, said insert bore being aligned with said holder bore at each of said first and second relative orientations, said insert bore being located substantially adjacent each cutting tip of said pair of cutting tips; and
means for releasably connecting said cutter insert to said cutter body when said second portion of said cutter insert is seated in said groove;
wherein said predetermined angle is such that when said second portion of said cutter insert is at said first orientation said first and second sides thereof have a first relative placement with respect to said groove and a selected one of said cutting tips is located at said centerline of rotation, and when said second portion of said cutter insert is at said second orientation said first and second sides thereof have a second relative placement with respect to said groove that is reversed with respect to said first relative placement and the other of said cutting tips is located at said centerline of rotation.

6. The ball nose cutter of claim 5, wherein said cutting edge means comprises:
a first cutting edge located at said first side of said first portion of said cutter insert, said first cutting edge originating substantially proximate said second portion of said cutter insert and terminating in said first cutting tip; and
a second cutting edge located at said second side of said cutter insert diametrically opposite said first cutting edge, said second cutting edge originating substantially proximate said second portion of said cutter insert and terminating in said second cutting tip.

7. The ball nose cutter of claim 6, further comprising:
a first planar face adjacent said first cutting edge, said first planar face being smoothly angled from being substantially co-planar with said first side at a location substantially proximate said second portion to being located at said central plane at said first cutting tip; and
a second planar face adjacent said second cutting edge, said second planar face being smoothly angled from being substantially co-planar with said second side at a location substantially proximate said second portion to being located at said central plane at said second cutting tip.

8. The ball nose cutter of claim 7, wherein said means for releasably connecting comprises said holder bore being threaded and a holding screw dimensioned to pass through said insert bore threadably engaging with the threads of said holder bore.

9. The ball nose cutter of claim 8, wherein said first predetermined shape of said groove is substantially circular having a predetermined radius of curvature which provides a first perimeter; and wherein said second predetermined shape of said second portion of said cutter insert is substantially circular having substantially said predetermined radius of curvature which provides a second perimeter, said first and second perimeters being mutually seatable with respect to each other.

* * * * *